(12) United States Patent
Grimanis et al.

(10) Patent No.: US 7,543,822 B2
(45) Date of Patent: Jun. 9, 2009

(54) COMPOSITE ROTARY SEAL ASSEMBLY

(75) Inventors: Michael P. Grimanis, Wayland, MA (US); Joseph K. Kaleshian, Burlington, MA (US)

(73) Assignee: A.W. Chesterton Company, Woburn, MA (US)

( * ) Notice: Subject to any disclaimer, the term of this patent is extended or adjusted under 35 U.S.C. 154(b) by 61 days.

(21) Appl. No.: 10/889,246

(22) Filed: Jul. 12, 2004

(65) Prior Publication Data

US 2006/0006605 A1 Jan. 12, 2006

(51) Int. Cl.
F16J 15/00 (2006.01)

(52) U.S. Cl. .................. 277/500; 277/543; 277/580; 277/581

(58) Field of Classification Search .......... 277/500, 277/543, 545, 549, 551, 553, 579–581, 589
See application file for complete search history.

(56) References Cited

U.S. PATENT DOCUMENTS

| | | | |
|---|---|---|---|
| 3,235,274 A * | 2/1966 | Cain, Jr. et al. | 277/500 |
| 3,685,840 A * | 8/1972 | Henry | 277/500 |
| 3,822,739 A * | 7/1974 | Kurschner | 165/9 |
| 4,074,908 A * | 2/1978 | Spencer | 277/500 |
| 4,358,120 A | 11/1982 | Moore et al. | |
| 4,396,199 A * | 8/1983 | Boyd et al. | 277/637 |
| 4,623,153 A | 11/1986 | Nagasawa et al. | |
| 5,014,999 A * | 5/1991 | Makhobey | 277/422 |
| 5,090,710 A | 2/1992 | Flower et al. | |
| 5,277,284 A * | 1/1994 | Pradel et al. | 188/322.17 |
| 5,474,305 A * | 12/1995 | Flower | 277/355 |
| 5,628,732 A | 5/1997 | Antoon, Jr. et al. | |
| 6,164,660 A * | 12/2000 | Goodman | 277/556 |
| 6,386,548 B1 | 5/2002 | Grimanis et al. | |
| 6,543,786 B2 | 4/2003 | Osumi et al. | |
| 6,640,943 B1 | 11/2003 | Daws et al. | |

\* cited by examiner

*Primary Examiner*—Vishal Patel
(74) *Attorney, Agent, or Firm*—Lahive & Cockfield LLP; Anthony A. Laurentano, Esq.

(57) ABSTRACT

A composite seal assembly for providing a seal between a rotating shaft and a static surface. The composite seal assembly includes first and second axially adjacent annular seal elements. The first and second seal elements each include a sealing edge contacting the shaft to provide a respective seal between the first and second seal element and the shaft. A static housing receives the first and second seal elements and engages the static surface to provide a static stationary seal, while concomitantly providing a flex region that engages the seal elements to form a dynamic seal therewith.

13 Claims, 6 Drawing Sheets

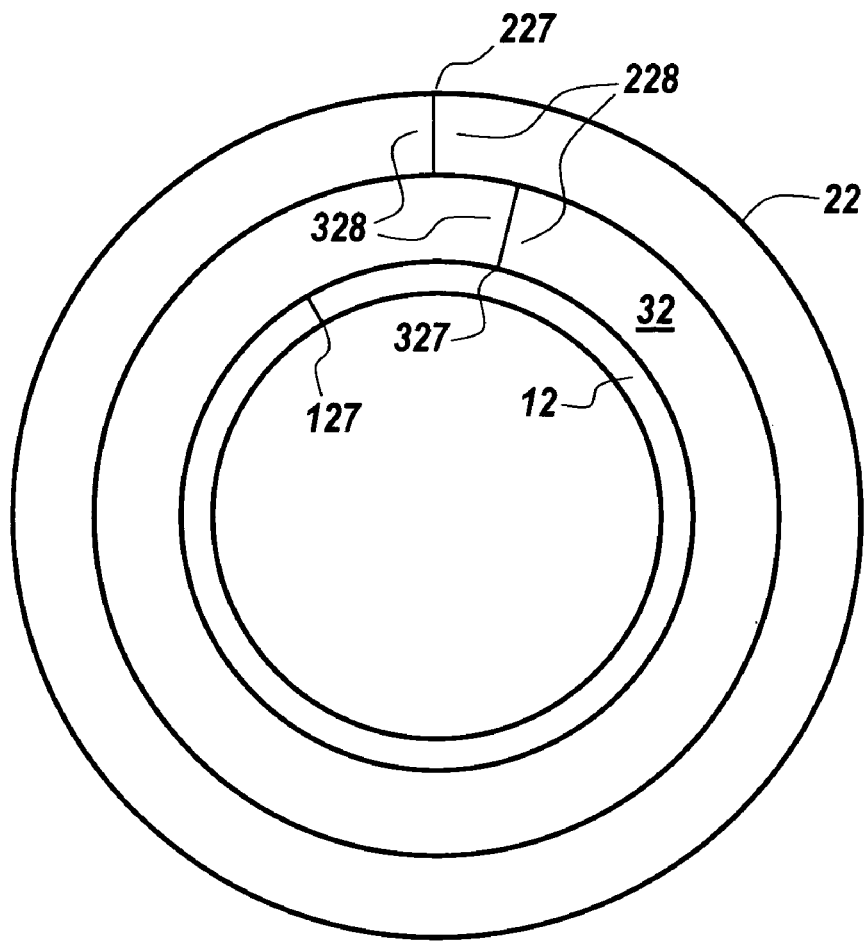
Fig. 7A
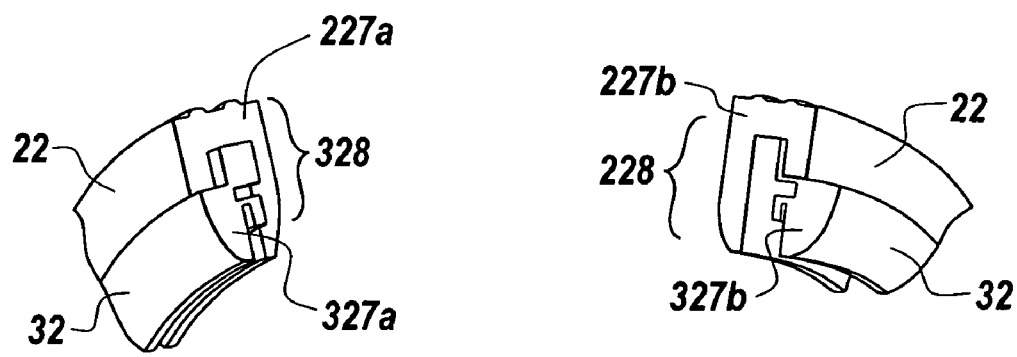
Fig. 7B
Fig. 7C

COMPOSITE ROTARY SEAL ASSEMBLY

FIELD OF THE INVENTION

The present invention relates to a seal assembly for sealing a shaft or a rod relative to a stationary housing component. In particular, the invention relates to a composite seal assembly for providing a seal between a rotating shaft and a stationary housing.

BACKGROUND OF THE INVENTION

Conventional sealing assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

A conventional sealing assembly generally comprises a sealing element formed of an elastomeric material and a spring or other resilient biasing element for biasing the sealing element against a rotating shaft. The biasing element biases the sealing element into sealing engagement with the shaft to form a fluid-tight seal.

However, such sealing assemblies suffer from a number of deficiencies and disadvantages. For example, the spring is typically exposed to the internal or process fluid of the mechanical apparatus being sealed, which can potentially degrade the spring, potentially leading to the failure of spring. In addition, springs and other movable biasing elements tend to lose their resilient biasing characteristics over time, impairing the efficiency of the seal.

Another drawback of conventional sealing assemblies is the poor wear characteristics of the elastomeric sealing elements. As the sealing elements wear, the amount of radial sealing force provided by the sealing element against the shaft decreases, resulting in a corresponding decrease in the sealing effectiveness of the sealing elements. This expected degradation in sealing performance necessitates frequent monitoring, replacement and/or adjustment of the sealing elements. The replacement and adjustment process thus requires frequent periods of down time for the system employing the seal assembly, which reduces overall system sealing efficiency and hence increases costs.

Other and more specific objects of this invention will in part be obvious and in part be evident from the drawings and description which follow.

SUMMARY OF THE INVENTION

The composite seal assembly of the present invention is adapted and configured for providing a fluid-tight seal between a rotating shaft and stationary equipment. The seal assembly employs relatively stationary components that produce a highly effective static seal, and movable, flexible components that dynamically ensure a fluid-tight seal when the seal assembly abuts the rotating shaft. The seal assembly of the invention hence has a composite design where different portions of the assembly are formed of different materials to optimally create dynamic and static sealing functions for mounting to or within the stationary equipment. Specifically, the composite seal assembly includes first and second axially adjacent annular seal elements that engage with a movable seal component, such as a flex region, for providing a dynamic fluid-tight seal against the shaft, and a static housing for accommodating the seal elements and for providing a static fluid-tight seal against the stationary equipment. The dynamic nature of a portion of the seal assembly allows the assembly to maintain a fluid-tight seal with the shaft during shaft run-out, shaft eccentries, and the like.

According to one aspect of the present invention, a composite seal assembly for providing a fluid-tight seal between a shaft and stationary equipment is provided. The composite seal comprises a first annular sealing element including a first dynamic sealing surface for contacting the shaft to provide a seal between the first annular sealing element and the shaft and a static housing including a compressible annular gap at a radially inner end for receiving first annular sealing element therein. The static housing includes a static sealing surface at a radially outer end for contacting the stationary equipment.

According to another aspect of the invention, a composite seal comprises a first annular sealing element including a first dynamic sealing surface for contacting the shaft to provide a seal between the first annular sealing element and the shaft and a static housing for applying a radial loading force to bias the first dynamic sealing surface into contact with the shaft.

According to another aspect of the invention, a composite seal comprises an outer housing component including a radially outer surface for providing a static seal against stationary equipment and an inner housing component coupled to the outer housing component through an interference fit. The outer housing component and the inner housing component cooperate to define a gap for receiving a dynamic sealing element including a dynamic sealing surface for sealing against the shaft.

According to another aspect of the invention, a method of sealing a shaft is provided, which comprises the steps of inserting an annular sealing element into an annular gap formed in a static housing and biasing a dynamic sealing surface on the annular sealing element into contact with the shaft.

According to yet another aspect of the invention, a composite seal comprises an outer housing component and an inner housing component coupled to the outer housing component to define a gap for receiving a dynamic sealing element. The outer housing component is split at a first interface and the inner housing component is split at a second interface that is staggered from the first interface.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

FIG. 7A is a side view of a split composite seal assembly including a plurality of split components according to one embodiment of the invention;

FIG. 7B illustrates the assembled split composite seal assembly at a first split interface between the static housing components; and FIG. 7C illustrates the assembled split composite seal assembly at a second split interface between the static housing components.

DETAILED DESCRIPTION OF THE PREFERRED EMBODIMENTS

The present invention provides a composite seal assembly for mounting to a rotating shaft, a reciprocating rod, or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical, hydraulic or pneumatic system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to the portion of stationary equipment and a seal assembly proximate the mechanical, hydraulic or pneumatic system employing the seal assembly. Conversely, the term "axially outer" as used herein refers to the portion of stationary equipment and a seal assembly distal from the mechanical, hydraulic or pneumatic system.

The term "radially inner" as used herein refers to the portion of the seal assembly proximate a shaft. Conversely, the term "axially outer" as used herein refers to the portion of the seal assembly distal from a shaft.

The terms "stationary equipment", "static surface" and "gland" as used herein are intended to include any suitable stationary structure housing a shaft or rod to which a seal is secured.

Figure 1A:
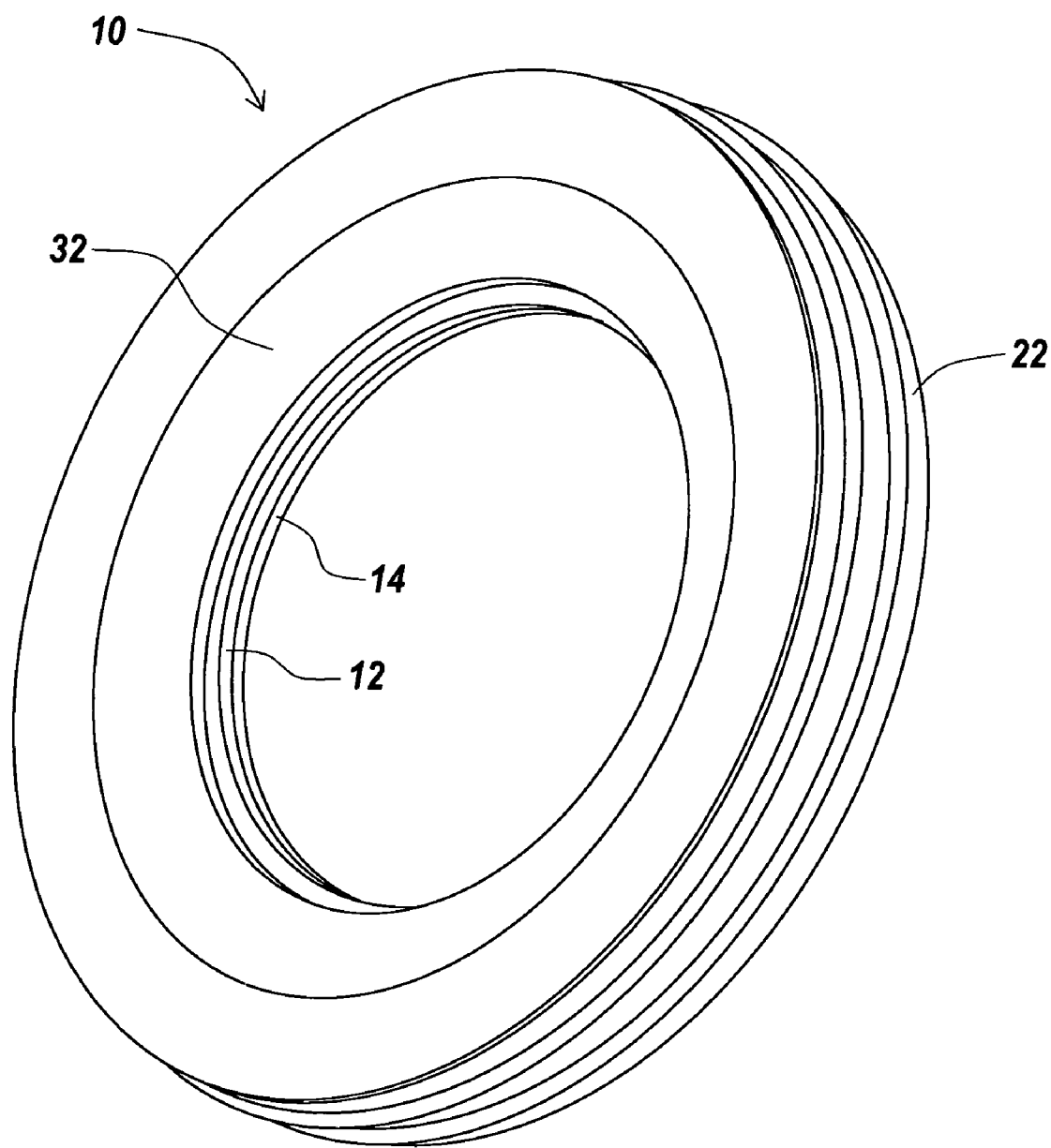
FIG. 1A is a perspective view of a composite seal assembly according to the teachings of the invention.
Figure 1B:
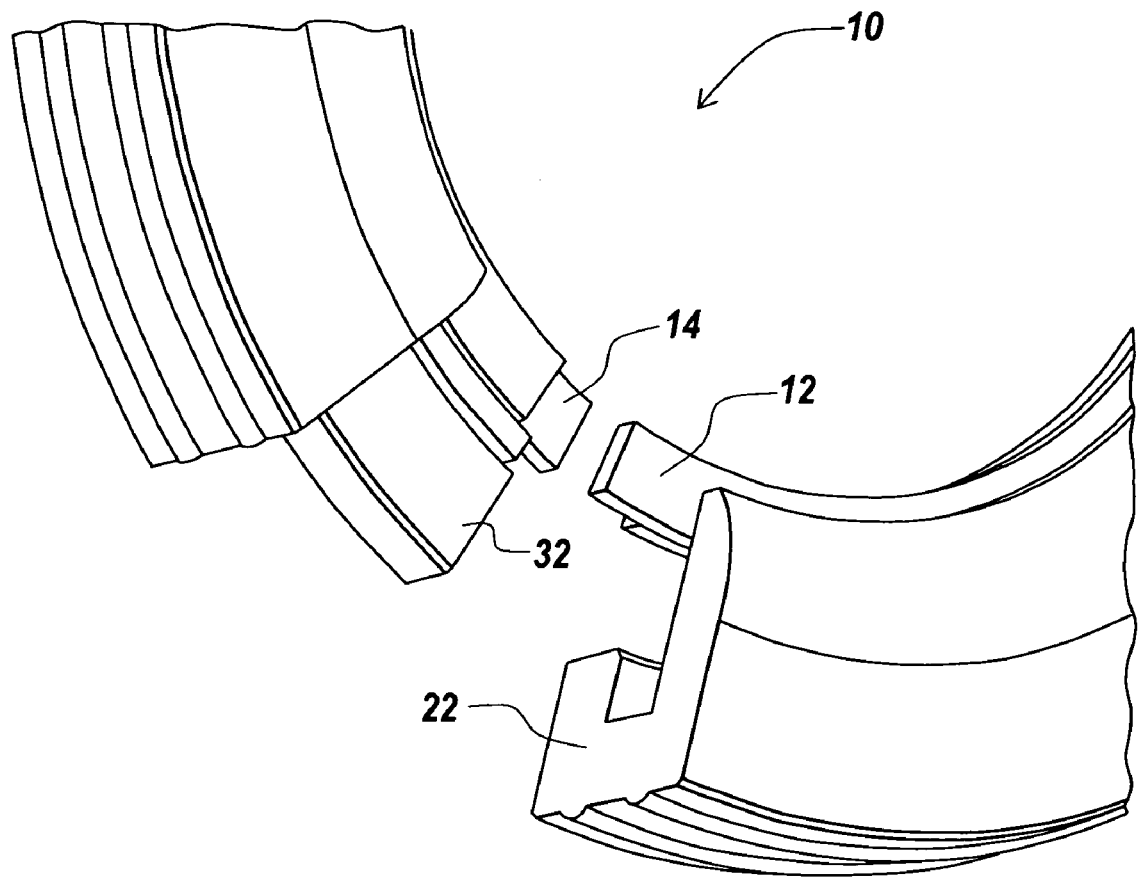
FIG. 1B is a detailed cut-away view of a portion of the composite seal assembly of FIG. 1A.
Figure 2:
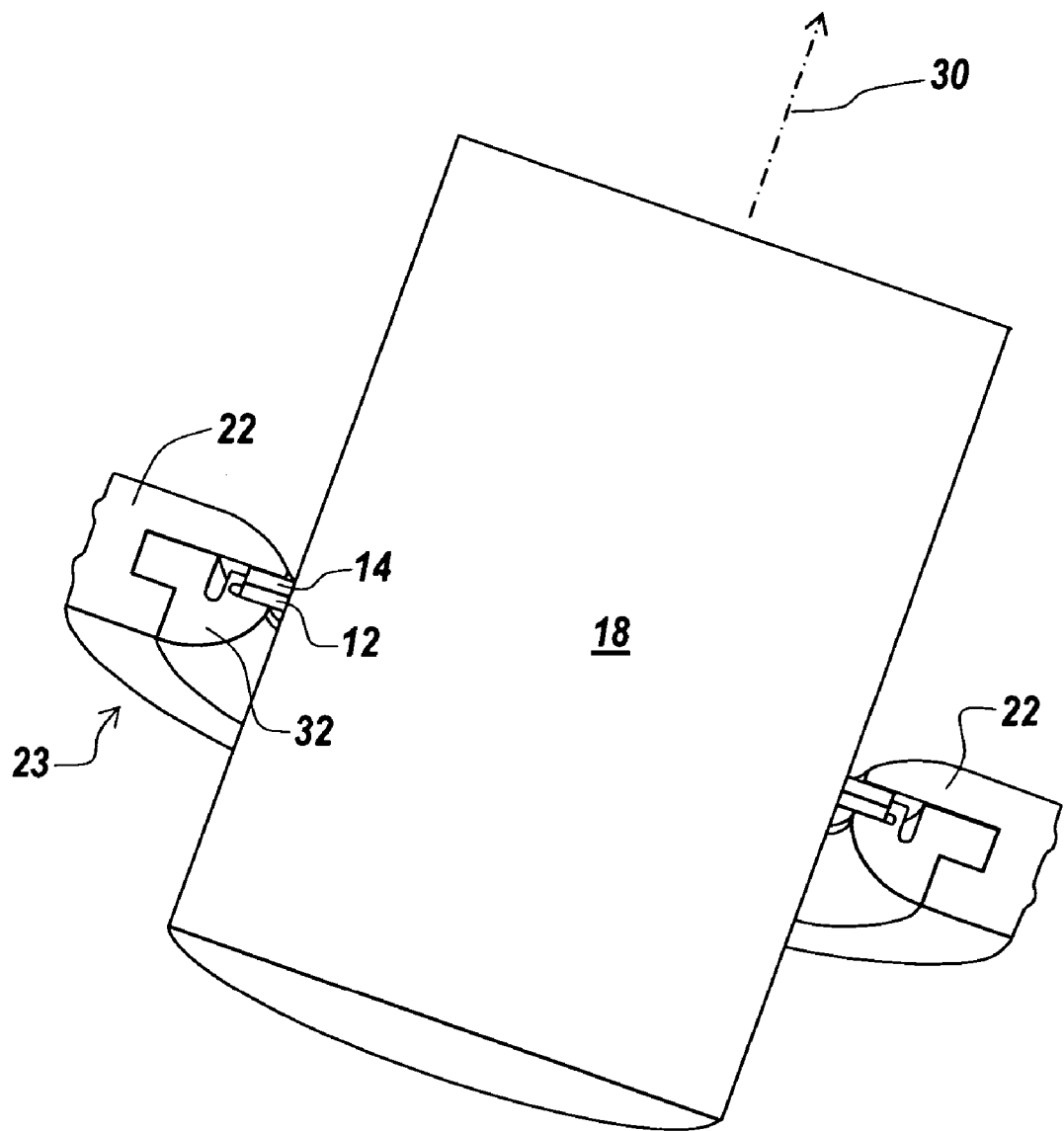
FIG. 2 is a cross-sectional side view of the composite seal assembly of FIG. 1 assembled on a shaft.
Figure 3:
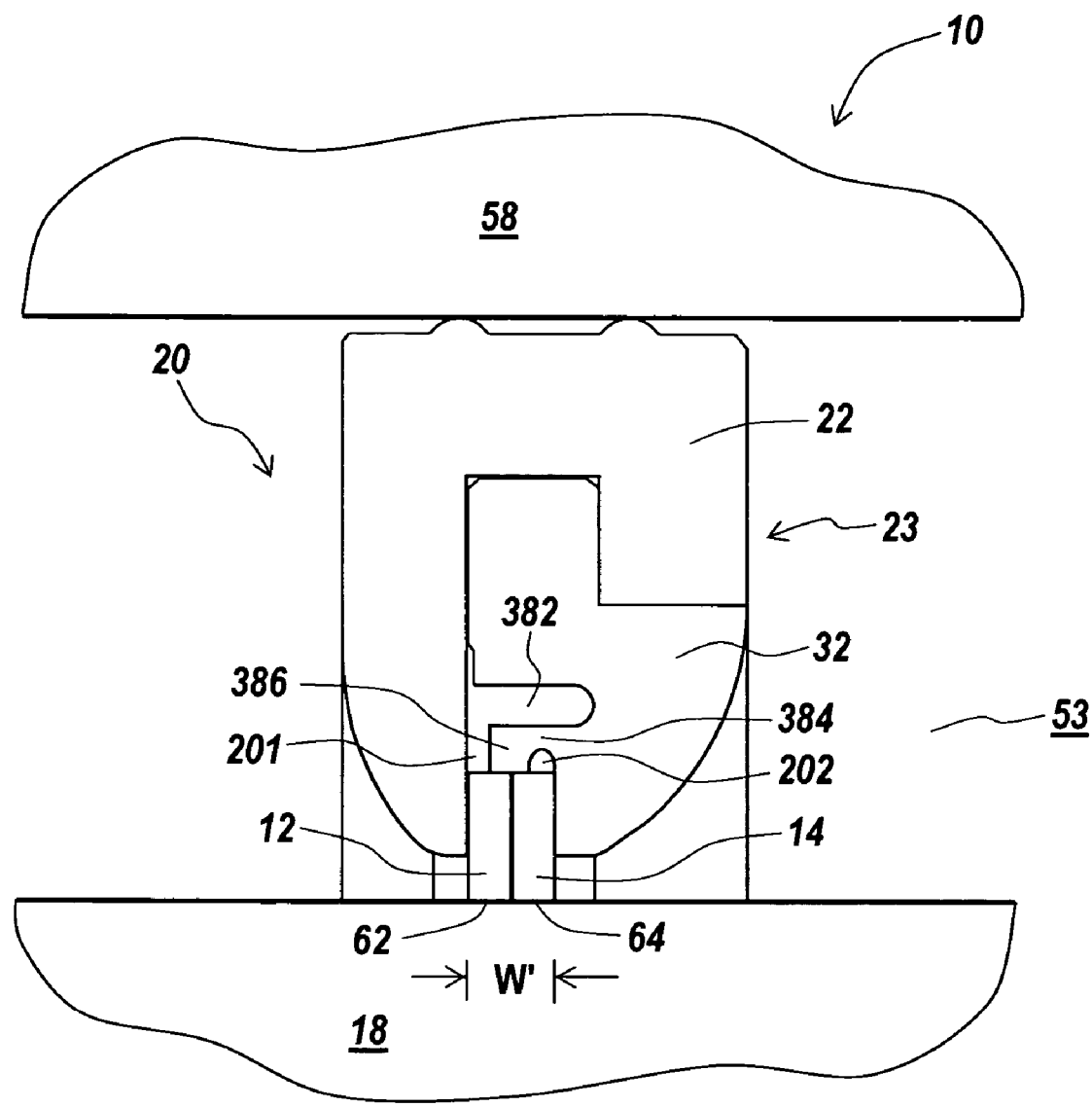
FIG. 3 is a fragmentary view in cross-section of the composite seal assembly of FIG. 1.

An exemplary embodiment of a seal assembly 10 in accordance with the teachings of the present invention is illustrated in FIGS. 1A, 1B, 2 and 3. The seal assembly 10 is preferably concentrically disposed about a rotating shaft 18 or a rod, as shown in FIGS. 2 and 3, and may be seated within an annular groove 53 formed within a gland or stationary equipment associated with a mechanical, hydraulic or pneumatic system 58 (hereinafter mechanical system). The shaft 18 extends along an axis 30, and is partially mounted within the housing. During operation of the mechanical system that employs the illustrated seal assembly 10, the shaft 18 rotates within or reciprocates along the axis 30 relative to system stationary equipment. The seal assembly 10 includes a plurality of sealing components 12, 14, 22, 32, configured to cooperate with each other to provide fluid sealing and a leak-proof path between the stationary equipment and the shaft 18, thereby preventing fluid from leaking from the mechanical system.

As shown in FIGS. 1A, 1B, 2 and 3, the seal assembly 10 includes a first annular seal element 12 and a second annular seal element 14 axially adjacent to the first annular seal element 12 for providing dynamic sealing against the shaft 18. The seal assembly 10 further includes a seal components 22 and 32 for receiving the seal elements 12, 14 and providing static sealing against a gland or other stationary component of the mechanical, hydraulic or pneumatic system. When assembled, the seal components of the seal assembly 10 cooperate to provide sealing between the seal elements and the shaft, between the seal elements and the other seal components, and sealing between the assembly and the mechanical, hydraulic or pneumatic system. The seal components of the seal assembly 10 are preferably held together through an interference fit, though one skilled in the art will recognize that any suitable means for assembling, fitting, securing and retaining the seal components or seal assembly components may be used.

As illustrated in FIG. 3, each seal element 12, 14 comprises a ring including a radially inner annular sealing surface 62 and 64, respectively, that engages the shaft 18 to establish first and second dynamic fluid seals of the seal assembly 10. In the illustrative embodiment the sealing elements 12, 14 have a substantially rectangular cross section, such that the sealing surfaces 62, 64 extend substantially straight and parallel relative to the outer surface of the shaft, and the remaining surfaces extend substantially perpendicular to each other and to the sealing surfaces 62, 64. One skilled in the art will recognize that the seal elements 12, 14 may have any suitable size and configuration for establishing one or more dynamic fluid seals with the shaft 18. For example, while the illustrative sealing surfaces 62, 64 are flat, the sealing surfaces 62, 64 can have any suitable shape suitable for abutting the shaft 18 to form a fluid seal. A significant advantage of employing removable and replaceable seal elements 12, 14, relative to the remaining seal components 22 and 32 (or static housing 23) of the seal assembly 10, is that the seal elements 12, 14 may be easily removed, replaced or repaired when the sealing surfaces 62, 64 are worn out.

Figure 4:
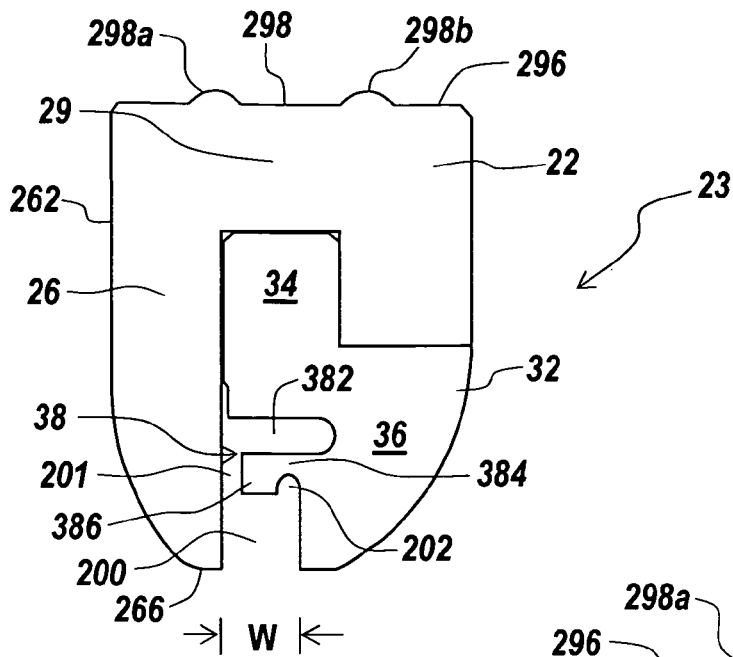
FIG. 4 is a cross-sectional view of the static housing of the composite seal assembly.

The illustrated static housing 23, shown in FIGS. 2, 3 and 4, comprises an outer housing or sealing component 22 and an inner housing or sealing component 32, which cooperate to receive the first and second annular seal elements 12, 14 therebetween. When assembled, the outer housing component 22 and the inner housing component 32 form an annular gap 200 at a radially inner end of the static housing 23 that is sized and configured to receive and hold the seal elements 12, 14. The inner housing component 32 applies a radial loading force to the dynamic seal elements 12, 14 to force the annular sealing surfaces 62 and 64 into contact with the shaft 18. The outer housing component 22 seats, captures or retains the inner housing component 22 and provides static sealing at an outside surface thereof to the stationary equipment when seated within the groove 53. When seated in the gap 200 between the static housing components 22, 32, the first and second annular seal elements 12 and 14 are radially biased into sealing engagement with the shaft 18 under a wide range of operation conditions, as described in greater detail below.

Figure 5:
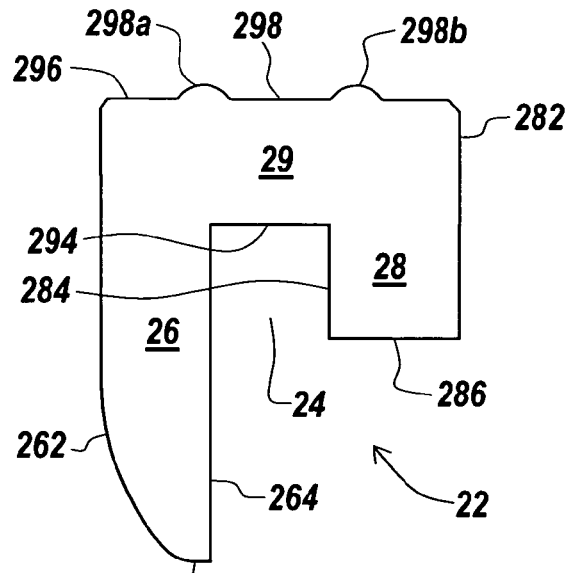
FIG. 5 is a cross-sectional view of the outer housing component of the static housing of FIG. 4.
Figure 6:
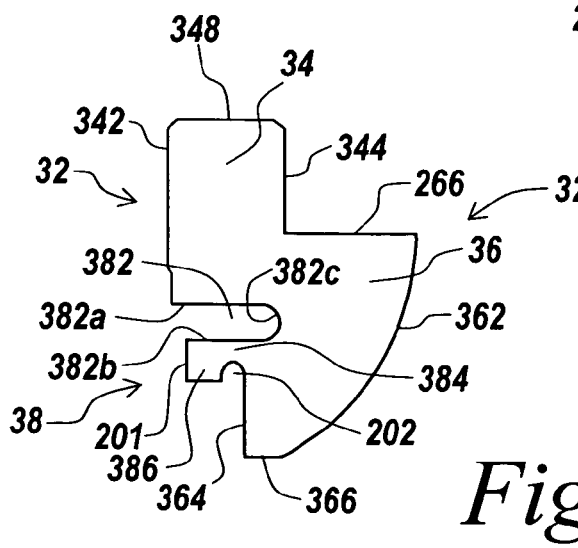
FIG. 6 is a cross-sectional view of the inner housing component of the static housing of FIG. 4.

FIGS. 5 and 6 are cross-sectional views of the outer housing component 22 and the inner housing component 32, respectively. As illustrated in FIG. 5, the outer housing component 22 has a substantially J-shaped cross section, forming an annular groove 24 for receiving therein an annular protrusion 34 of the inner housing component 32. The outer housing component 22 includes an axially forward arm 26 and an axially rear arm 28 separated from the axially forward arm 26 by the annular groove 24. The axially rear arm 28 is preferably shorter than the axially forward arm 26 to form the J-shaped cross-section.

The axially forward arm 26 comprises an outer surface 262, comprising an axially forward facing, radially extending surface. In the illustrative embodiment, the outer surface 262 is tapered toward the radially inner side of the seal assembly 10. The axially forward arm 26 also includes an inner surface 264. The inner surface 264 comprises an axially rearward facing, radially extending surface, which forms a sidewall of the groove 24. The axially forward arm 26 may have a bottom surface 266 connecting the inner surface 264 and the outer surface 262 of the axially forward arm 26. In the illustrative embodiment, outer surface 262 tapers toward the inner surface 264, resulting in a relatively small bottom surface 266. Alternatively, the outer surface 262 may directly join the inner surface 262 without an intermediate bottom surface 266. In another embodiment of the invention, the outer surface 262 extends substantially straight or away from the inner surface 264, resulting in a relatively larger bottom surface 266. Those of ordinary skill will readily recognize that the arm 26 of the outer housing component 22 can have many different configurations.

The axially rear arm 28 of the outer housing component 22 is substantially shorter than the axially forward arm 26 to accommodate the inner housing component 32. The axially rear arm 28 is defined by an inner surface 284 comprising an axially forward facing, radially extending surface 284 forming a second sidewall of the groove 24. An outer surface 282 of the axially rear arm 28 comprises an axially rearward facing surface extending in the radial direction. A radially inner bottom surface 286 connects the inner surface 284 and the outer surface 282 and extends substantially parallel to the longitudinal axis of the shaft 18 and substantially perpendicular to the inner surface 284 and the outer surface 282 The bottom surface 286 is configured to abut or engage an axially extending surface 266 of the inner housing component 32, as described below.

The outer housing component 22 further includes a connecting portion 29 connecting the axially forward arm 26 and the axially rear arm 28 to define the groove 24. The connecting portion 29 is defined by an axially extending radial inner surface 294 extending between and connecting the radially extending side walls 264, 284. The connecting portion 29 is further defined by an axially extending radial outer surface 296. The outer surface 296 is configured to form a static seal with a static surface of the stationary equipment or a gland of the system 20. An optional groove can be provided on the outer surface 296 for receiving an O-ring to facilitate sealing of the seal assembly 10 against a surface of the stationary equipment. Alternatively, an outer surface 298 can be formed between protrusions 298a, 298b extending from the outer surface 296, as illustrated. The protrusions are adapted to seal against a wall of the groove 53 to form a fluid-tight seal. Alternatively, the outer groove 298 can be carved, scored, etched, cut or otherwise formed in the outer surface 296. One skilled in the art will recognize that any suitable means for providing a static seal between the outer housing component 22 and a static surface, such as stationary equipment or a gland, may be used.

One skilled in the art will recognize that the outer housing component 22 is not limited to the illustrated orientation and configuration. For example, the position and orientation of the arms 26, 28 can be reversed, such that the component described as the shorter axially rear arm 28 could alternatively be provided axially forward of the longer axially forward arm 26. Alternatively, both arms 26, 28 defining the groove 24 can have a substantially similar length. Other configurations are also contemplated.

Referring to FIG. 6, the inner housing component 32 is configured to cooperate with the outer housing component 22 to receive the seal elements 12, 14 therebetween. As shown, the inner housing component 32 includes a radially outer annular protrusion 34 configured to be received in the groove 24, and a body portion 36, which cooperates with the arm 26 of the outer housing component to form the gap 200 for receiving the seal elements 12 and 14. The inner housing component 32 also includes a flex region 38 for selectively flexing the gap 200 to accommodate the seal elements and for applying a radially inward force on the seal elements 12, 14.

The annular protrusion 34 is preferably sized and dimensioned so as to be held within the groove 24 via friction fit, though one skilled in the art will recognize that any suitable means for coupling the inner and outer housing components may be used in accordance with the teachings of the present invention. The interference fit between the annular protrusion 34 and the groove 24 provides a fluid seal between the inner housing component 32 and the outer housing component 22.

The illustrative protrusion 34 has a rectangular shape, though one skilled in the art will recognize that the protrusion 34 and associated groove 24 may have any suitable size, shape and configuration. As shown, the protrusion comprises a forward wall 342 configured to abut the side wall 264 of the groove, a top wall 348, which extends in the axial direction and faces in the radially outer direction, configured to abut the radially inner facing surface 294 and a back wall 344 configured to abut the side wall 284 of the groove. To complement the configuration of the illustrative groove 24, the walls 342 and 344 extend substantially perpendicular to the top wall 348, though one skilled in the art will recognize that the protrusion 34 and associated groove 24 may have any suitable complementary configurations.

The axially rearward body portion 36 of the inner housing component 32 in the illustrative embodiment is configured so that when the outer housing component 22 and the inner housing component 32 are assembled, the resulting static housing 20 is substantially symmetrical about a radially extending central plane. The body portion 36 includes an axially extending wall 366 configured to abut the bottom surface 286 of the arm 28 and an outer surface 362 that may be substantially complementary to the outer surface 262 of the axially forward arm 26 of the outer housing component. A radially extending inner wall 364 on the body portion 36 cooperates with the radially lower portion of the inner surface 264 to form the gap 200 for receiving the seal elements 12, 14. In the illustrative embodiment, the outer surface 362 is substantially arc-shaped and tapers axially and radially inwards from the wall 366 towards the gap 200. When the static housing 23 is assembled, the outer surface 362 of the inner housing component 32 aligns with the rear outer surface 282 of the outer housing component. As shown, an axially extending bottom surface 366, corresponding to the axially extending bottom surface 266 of the arm 26, extends from the outer surface 362 and connects the outer surface 362 to the inner surface 364.

The inner housing component 32 forms the flex region 38 between the gap 200 and the annular protrusion 34 and between the body portion 36 and the axially forward arm 26 of the outer housing component when the static housing 23 is assembled, i.e., in an axially and radially central region of the seal assembly 10. The flex region 38 is configured to allow the housing to receive and apply a radial force to the seal elements 12, 14. The illustrative flex region 38 includes an axially extending groove 382 and a flexible arm 384 connecting with an optional protrusion 386 that defines a radially outer boundary of the gap 200. The geometry of the flex region 38 is not limited to the illustrative embodiment, and can be altered or configured to have any suitable shape sufficient to provide a selected amount of radial force or to vary the amount of radial force applied to the seal elements 12, 14.

The groove 382 extends between the body portion 36 and the axially forward arm 26 of the outer housing component and is formed between the protrusion 34 and the flexible arm 384. The axially extending groove 382 is defined by a first axially extending wall 382a defining a bottom surface of the annular protrusion 34, a second axially extending wall 382b extending from the body portion and separated from the first wall 282a by a selected distance, and a third wall 382c connecting the first wall 382a and second wall 382b. The second wall 382b defines an upper surface of the flexible arm 384 and protrusion 386. The third wall 382c of the groove 382 forms a radially extending surface of the body portion 36.

The protrusion 386 is spaced from the axially forward arm 26 by a first radially extending gap 201 and the body portion 36 by a second radially extending gap 202. The flexible arm 384 connects an upper portion of the protrusion 386 to the body portion 36 over the second gap 202. The use of a flexible arm 384 to connect the protrusion 386, which otherwise floats between the outer housing component 22 and the rest of the inner housing component 32, allows the protrusion 386 to dynamically move relative to the rest of the static housing 20 and selectively compress the gap 200 during use. Hence, the seal assembly 10 operates as a static seal within the groove while concomitantly providing dynamic sealing characteristics. This occurs when the flex region 38 dynamically moves to accommodate and/or to maintain the sealing relationship between the seal elements 12, 14 and the shaft 18. This dynamic sealing arrangement allows the seal assembly 10 to handle fluid and mechanical perturbations that may otherwise affect or break the fluid seal between the sealing assembly and the shaft.

In the illustrative embodiment, forces applied to the outer surface of the outer housing component translate into sealing forces at the interfaces between the inner housing component 32 and the outer housing component 22. In this manner, the static housing 23 can be handled as a single unit, and leaks are prevented.

Referring to FIGS. 3 and 4, in a relaxed state, the axial width W of the gap 200 is slightly less than the combined width W' of the sealing elements 12, 14. The flex region 38 allows the gap 200 to flex to accommodate sealing elements 12, 14, and to compress around the sealing elements 12, 14 to secure or retain the sealing elements 12, 14 therein.

As shown in FIGS. 2 and 3, when the seal 10 is assembled, the sealing elements 12, 14 extend past the radially inner end of the static housing 23, to allow the sealing surfaces 62, 64 to contact and seal against the shaft 18, while the static housing 20 is spaced from and does not directly contact the shaft 18. In this manner, the seal elements 12, 14 can spin with the shaft 18 to provide a dynamic sealing surface, while the static housing 23 remains stationary and provides static sealing against a gland or other static surface.

During operation, the first annular sealing edge 62 and the second annular sealing edge 64 of the seal elements 12, 14 contact the outer surface of the shaft 18, while the outer surface or a seal on the outer surface of the outer housing component 22 contacts the outer static surface of the stationary equipment to provide a fluid seal between the stationary equipment and the shaft 18. The combined radial length of the seal 10 in an undeformed state is preferably selected to be less than the distance between the static housing and the shaft, such that the flex region 38 dynamically compresses a selected amount to provide a resilient, elastic radially inner sealing force at the seal edges 62, 64. The radial sealing forces cooperate to provide a fluid seal between the seal assembly 10 and the shaft 18 by forcing the sealing edges 62 and 64 into engagement with the shaft 18. In this manner, the seal assembly 10 of the present invention provides a fluid tight seal during operation. According to a typical practice, the radial loading force can be of the order of about 1 pound per circumferential inch, but can typically varies inversely with shaft speed. As opposed to other type of sealing arrangements, the seal assembly 10 of the present invention is typically not concerned with seal extrusion since the shaft moves at relatively lower speeds. Those of ordinary skill will readily recognize that this need not be the case.

According to an embodiment of the invention, the seal assembly 10 may be constructed of a composite structure that utilizes different materials to facilitate dynamic and static sealing. The type of material used for each seal component 12, 14, 22 and 32 depends on one or more factors, including the speed of the shaft, fluid type, fluid temperature, surface finish, cost, pressure of the fluid being sealed, the PV (pressure and velocity) factor of the particular material, and the like. The material selected preferably minimizes wear to maximize the lifetime of the seal 10. The components 12, 14, 22, 32 can also have different hardness values to facilitate sealing. One of ordinary skill in the art will be able to select the appropriate materials based on the foregoing considerations. According to one practice, the seal components 22 and 32 can be formed of the same or different materials. Likewise, the seal elements 12 and 14 can be formed of the same or different materials, and are preferably formed of the same material, which may or may not be different from the material (s) used for the seal components 22 and 32.

The first and second seal elements 12 and 14 are preferably selected based on surface speed and wear requirements. For example, the material forming the sealing elements 12, 14 is preferably capable of low to high speed motion. Suitable materials include polytetrafluoroethylene (PTFE) and ultra high molecular weight polyethylene (UHMWPE) material. According to a preferred embodiment, the material forming the seal elements 12, 14 comprises PTFE with polyamide, which can include TEFLON with known fillers, though one skilled in the art will recognize that other suitable materials may be used.

The static housing components 22 and 32 can be formed from any material that is compatible and suitable with the fluid of the housing or mechanical system, the speed or velocity of the shaft, pressure within the mechanical system, and the like. According to the present invention, the static housing components 22 and 32 are preferably formed of an elastomer, polyurethane, PTFE material or other suitable material. The material for the static housing 23 is preferably suitable for providing radial loading of the dynamic seal elements 12 and 14. According to a preferred practice, one or more of the seal components is formed of polyurethane.

The force applied by the housing components can be varied, adjusted, or selected by the component configuration and by the particular material used. For example, the sealing components 22 and 32 can be formed of different materials to provide different types of sealing. According to one practice, the seal component or inner housing 22 can optionally be formed of a material that allows resilient movement of the flex region to form, assist with or maintain a dynamic sealing function, while the seal component or outer housing 32 can be formed of a more rigid material that is suitable to effect a static sealing function. Further, the seal elements 12 and 14 are formed of materials selected based on speed and wear requirements to provide a dynamic sealing function. Hence, the composite seal assembly 10 can utilize different materials to provide varying static and dynamic sealing functions.

In a preferred embodiment of the invention, one or more components of the seal assembly 10 can be split to facilitate installation, replacement, monitoring or inspection of the composite seal assembly 10. In particular, the installation, replacement, and inspection of the split seal elements 12 and 14 of the composite seal assembly 10 can be performed without necessitating the complete breakdown of the mechanical system and without having to pass the seal elements over an end of the shaft 18. Each split forms arcuate seal segments of each components 12, 14, 22 and/or 32 that connect at the interface through corresponding split surfaces.

The splits on the components 12, 14, 22, and 32, respectively, can be staggered to prevent axial leakage of fluid. For example, as shown in FIGS. 7A, 7B and 7C, the split 327 on the inner housing component 32 can be staggered from the split 227 on the outer housing component. A split 127 on the first sealing element 12 can likewise be staggered from a split on the second sealing element (not shown) and/or the splits 227 and 327. The inner housing component 32 is split at an interface to form first and second split surfaces 327a, 327b, which abut each other when the inner housing component 32 is assembled. The outer housing component 22 is split at an interface to form first and second split surfaces 227a, 227b, which are mechanically loaded together and abut each other when the outer housing component is assembled. When the seal is loaded, the fit of the seal assembly 10 between the stationary equipment and the shaft, as well as the interference fit between the housing components 22 and 32, compresses the seal about the circumferences, and compresses the split surfaces together to provide axial and radial sealing therebetween.

As shown in FIG. 7B, due to the stagger between the splits 227 and 327, the first split surface 327a of the inner housing component 32 protrudes relative to a first split surface 227a of the outer housing component 32 to form a radially protruding interconnecting edge 328. As shown in FIG. 7C, a second split surface 227b of the outer housing component 22 extends past the second split surface 327b of the inner housing component by a corresponding amount to form a recessed interconnecting edge 228. The composite surface, i.e., the radially protruding interconnecting edge, formed by the first split surfaces 227a, 327a of the assembled static housing 20 is thus complementary to the composite surface, i.e., the recessed interconnecting edge, formed by the second split surfaces 227b, 327b of the assembled static housing 20. When the static housing 20 is assembled, the recess 228 receives the protruding edge 328 to promote interlocking of the static housing segments when assembled.

One or more of the seal components can be split at an interface to form arcuate seal segments and that connect at the interface through complementary, mating interconnecting edges having a generally non-planar or non-linear design to promote the interlocking of the seal segments when assembled. Other configurations of the split edges can also be employed to provide proper and adequate fluid sealing.

Alternatively, the seal elements 12, 14 and/or the static housing components 22, 32 can be split at a second interface to allow the seal segments to be completely separated into separate seal segments. One skilled in the art will further appreciate that the seal elements 12 and 14 can also be split and positioned at additional staggered points, to provide additional fluid sealing.

According to an alternate embodiment, the components of the seal 10 may be unitary, and be sized and configured to provide the attributes and functions described above. One skilled in the art will recognize that, for example, the seal elements 12, 14 may comprise a unitary sealing element, and/or that the static housing 23 may comprise a unitary component, rather than an outer and inner housing component coupled together as shown and described above. Those of ordinary skill will readily recognize that the components of the seal assembly 10 can be split at more than one location.

Preferably, the composite seal, while assembled from a plurality of components, can be handled and installed as a single element, rather than individually installing each component into the equipment. This saves time when using and installing the seal assembly of the present invention.

The composite seal assembly 10 of the present invention provides significant advantages over prior seal assemblies. The use of a static housing with removable sealing elements allows for the sealing elements to be easily replaced when worn out. The flex region ensures that the sealing elements are maintained in constant contact with the shaft to ensure a fluid seal. The seal 10 can be easily installed and removed without requiring equipment breakdown.

While the exemplary embodiment of the composite seal assembly 10 of the present invention is described above in connection with a rotating shaft, one skilled in the art will recognize that the composite seal assembly 10 can be used in many different environments and applications, including, for example, to provide fluid sealing about a reciprocating rod.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A composite seal assembly for providing a seal between a shaft and a static surface, the shaft extending along a longitudinal axis, the composite seal assembly comprising: a first annular seal element having a dynamic sealing surface for contacting the shaft to provide a seal between the first annular seal element and the shaft; and a static housing having a compressible annular gap at a radially inner end for receiving the first annular seal element therein, the static housing comprising: an outer housing defining a static sealing surface at a radially outer end for contacting the static surface; and an inner housing component received in the outer housing component and having a flex region comprising: a protrusion defining a radially outer boundary of the annular gap for directly contacting with and applying the radial loading force to the first annular sealing element to bias the first sealing element into engagement with the shaft when the first annular sealing element is received in the annular gap, a flexible arm integrally attached to the inner housing, and the protrusion extends between an axially extending groove formed in the static housing and the annular gap, and is spaced from an axially forward end of the static housing by a first radially extending gap and from an axially rearward end of the static housing by a second radially extending gap.

2. The composite seal assembly of claim 1, further comprising a second annular seal element having a dynamic sealing surface for contacting the shaft, wherein the second annular seal element is disposed axially adjacent to the first annular sealing element in the annular gap.

3. The composite seal assembly of claim 1, wherein said first and second annular seal elements have a substantially generally rectangular cross section.

4. The composite seal assembly of claim 1, wherein the outer housing component and the inner housing component cooperate to form the annular gap therebetween at a radially inner end of the static housing.

5. The composite seal assembly of claim 2, wherein the annular gap has a width that is smaller than a combined width of said first and second seal elements.

6. The composite seal assembly of claim 5, wherein the annular gap is adapted to flex to accommodate the first and second seal elements, thereby holding the sealing elements via friction fit.

7. The composite seal assembly of claim 1, wherein said annular sealing element is split at a first split interface.

8. The composite seal assembly of claim 2, wherein the second annular seal element is split at a second split interface.

9. The composite seal assembly of claim 8, wherein the second split is staggered from the first split interface.

10. The composite seal assembly of claim 1, wherein said static housing is split.

11. The composite seal assembly of claim 1, wherein the outer housing component is split at a first split interface and said inner housing component is split at a second split interface that is staggered from the first split interface.

12. The composite seal assembly of claim 1, wherein the static sealing surface comprises an o-ring seated in a groove formed on a radially outer surface of the static housing.

13. The composite seal assembly of claim 1, wherein said dynamic sealing surface of said sealing element extends past the radially inner end of the static housing when the sealing element is received in the annular gap.

* * * * *